UNITED STATES PATENT OFFICE.

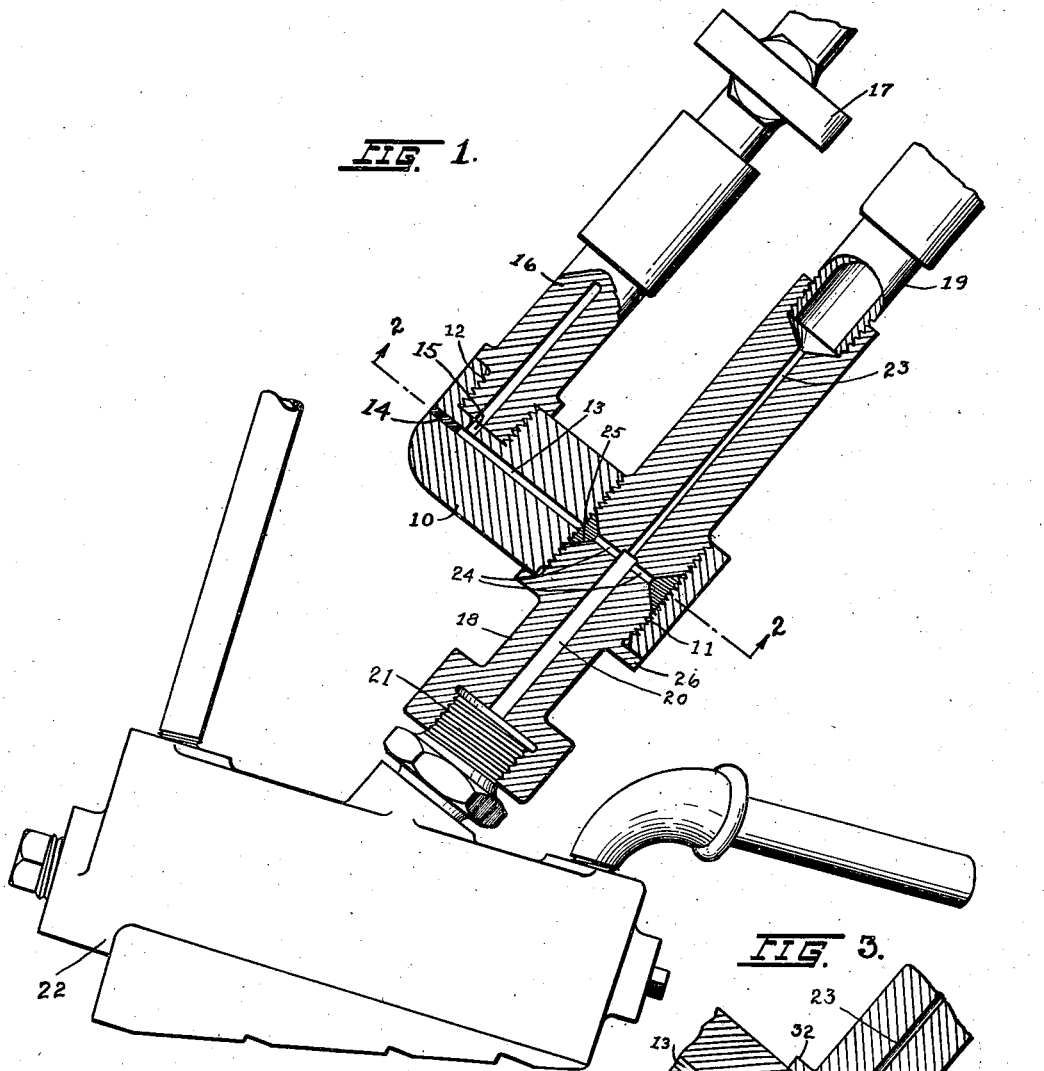

WILLIS McKEE, OF CLEVELAND, OHIO, ASSIGNOR TO THE ELYRIA IRON & STEEL COMPANY, OF CLEVELAND, OHIO, A CORPORATION OF OHIO.

WELDING APPARATUS.

1,420,720.  Specification of Letters Patent.  Patented June 27, 1922.

Application filed March 22, 1919. Serial No. 284,410.

*To all whom it may concern:*

Be it known that I, WILLIS McKEE, a citizen of the United States, and a resident of Cleveland, county of Cuyahoga, State of Ohio, have invented certain new and useful Improvements in Welding Apparatus, of which the following is a specification.

This invention relates to blow pipes or torches such as are used in gas welding processes, and has for one of its objects the simplification and cheapening of the construction of devices of this character without reducing their efficiency.

Another object of the invention is to provide a device of the kind described in which the parts are accessible and may be readily assembled and disassembled.

Other objects and the features of novelty will be apparent from the following description, taken in connection with the accompanying drawings, of which;

Figure 1 is a side elevation of apparatus embodying the invention, with certain parts shown in section;

Figure 2 is a section on the line 2—2 of Figure 1; and

Figure 3 is a fragmentary section showing the modification.

Referring to the drawings, 10 indicates a head block which may be supported in any suitable manner and which has a threaded bore 11 extending therethrough, and a threaded recess 12 the axis of which is preferably parallel to the axis of the bore 11. A passage 13 extends through the head block and has its outer end closed by means of a plug 14 and its inner end in communication with the bore 11. A passage 15 extends from the recess 12 to the passage 13. A gas supply connection 16 is secured in the recess 12 and the flow of gas is controlled by means of a valve 17. A barrel 18, having its middle portion externally threaded, is secured in the bore 11 and projects from opposite sides of the head block 10. A projection on one side of the head block has connected thereto a gas supply pipe 19 and the projection on the opposite side is provided with a mixing chamber 20 and a connection 21 for the tip 22, the latter being of any preferred construction. A passage 23 conducts the gas from the pipe 19 to the chamber 20, and one or more radially extending passages 24 establish communication between the chamber 20 and the groove 25 on the exterior of the barrel 18, and in alignment with the passage 13, for the purpose of conducting gas from the latter to the chamber 20. The barrel 18 has a flange 26 which coöperates with one face of the head block 10 to position the barrel and make a tight joint.

I have discovered that when the apparatus is used for oxygen and acetylene, by supplying the oxygen from the side, through passage 13, and the acetylene in an axial direction, through passage 23, there is a much better mixture of the gases and a more uniform flame with greater economy of the gases results than when the gas supplies are reversed.

Referring to Figure 3, it will be noted that a modification of the construction above described is shown, and in this construction the barrel 20, shown in Figure 1, is made in two pieces 30 and 31, respectively, which are threaded into the bore 11 from opposite sides of the head block and which are provided with positioning shoulders 32 and are of such length as to provide a small space 33 between their adjacent ends in alignment with the passage 13. In other respects this construction may be the same as that shown in Figure 1.

While I have illustrated and described what I now consider the preferred form of my invention, I desire to have it understood that many obvious changes in the details may be made without departing from the spirit of the invention as defined in the appended claims.

Having thus described my invention, what I claim is;—

1. In apparatus of the class described, a head block having a threaded opening extending through one end, a threaded bore adjacent its other end, the axis whereof is substantially parallel with that of the opening, and a passage connecting the bore and opening, a supply connection screwed into said bore and a barrel having a threaded portion intermediate its ends screwed into said opening, said threaded portion being grooved circumferentially in the plane of the aforesaid passage the barrel having a longitudinal bore enlarged throughout a part of its length to provide a mixing chamber, and one or more passages leading from said groove into the mixing chamber.

2. In apparatus of the class described, a head block having a threaded opening and a passage communicating therewith, a gas supply connection with said passage, and means secured in said threaded opening and projecting on opposite sides of said block, the projection on one side of the block being provided with a mixing chamber and a welding tip connection, and the projection on the other side of the block having a gas supply passage, and both of said passages being in communication with said chamber.

3. In apparatus of the class described, a head block, a member having a mixing chamber carried by said block, a combustible gas supply arranged to deliver the gas longitudinally of said chamber, and an oxygen supply passage arranged in said head block transversely of said chamber to supply gas laterally into the current of incoming combustible gas.

In testimony whereof I affix my signature.

WILLIS McKEE.